United States Patent [19]

David et al.

[11] 4,286,076

[45] Aug. 25, 1981

[54] PROCESS FOR STABILIZING ACRYLONITRILE POLYMER SPINNING SOLUTIONS

[75] Inventors: Karl-Heinz David; Alfred Nogaj; Heinrich Rinkler, all of Dormagen, Fed. Rep. of Germany

[73] Assignee: Bayer Aktiengesellschaft, Leverkusen, Fed. Rep. of Germany

[21] Appl. No.: 54,727

[22] Filed: Jul. 5, 1979

[30] Foreign Application Priority Data

Jul. 21, 1978 [DE] Fed. Rep. of Germany ....... 2832212

[51] Int. Cl.³ .................. C08K 5/09; C08L 33/20; C08L 33/02
[52] U.S. Cl. ................. 525/221; 260/32.6 N; 264/182; 525/209; 525/336; 525/340
[58] Field of Search ................. 264/182; 260/32.6 N; 525/209, 221, 336, 340

[56] References Cited

U.S. PATENT DOCUMENTS

| | | | |
|---|---|---|---|
| 2,503,245 | 4/1950 | Coover et al. | 260/32.6 |
| 2,642,408 | 7/1953 | Stanin et al. | 260/32.6 |
| 3,793,277 | 2/1974 | Thompson | 264/182 |

FOREIGN PATENT DOCUMENTS

| | | |
|---|---|---|
| 236642 | 3/1964 | Austria . |
| 2315283 | 10/1973 | Fed. Rep. of Germany . |
| 113016 | 5/1975 | Fed. Rep. of Germany . |
| 123098 | 11/1976 | Fed. Rep. of Germany . |

*Primary Examiner*—Carman J. Seccuro
*Attorney, Agent, or Firm*—Sprung, Felfe, Horn, Lynch & Kramer

[57] ABSTRACT

The invention relates to a process for the stabilization of a spinning solution of an acrylonitrile polymer and a solvent which comprises adding from 0.005 to 0.5% based on the quantity of polymer of at least one stabilizer selected from a polyfunctional phosphonic acid, a phosphonocarboxylic acid or a polymer containing phosphonic acid and/or carboxyl groups to the spinning solution as well as to such stabilized spinning solutions.

7 Claims, No Drawings

PROCESS FOR STABILIZING ACRYLONITRILE POLYMER SPINNING SOLUTIONS

The present invention relates to a process for stabilizing spinning solutions consisting of acrylonitrile polymers and an organic solvent to prevent the crystallization of inorganic salts which are present in a small quantity in the polymer during the preparation and processing of the spinning solution.

Acrylonitrile homopolymers and copolymers, particularly those prepared by precipitation polymerisation in water in the presence of a redox system of inorganic salts, e.g. a system of potassium peroxodisulphate, sodium bisulphite and iron sulphate, contain inorganic compounds which are not completely removed even by the washing process normally employed. A reduction in the quantity of salt in the polymer can be achieved by prolonged washing and an increase in the quantity of wash water used, but this increases the manufacturing costs, but even then, complete removal of the inorganic salts can only be achieved with extremely long washing times at elevated temperatures. The salts present are mainly sodium sulphate and potassium sulphate which are formed as decomposition products of the redox system. When acrylonitrile polymers containing small quantities of these salts are dissolved in organic solvents such as dimethyl formamide and dimethyl acetamide at temperatures below 100° C., clear spinning solutions are initially obtained but after some time, and particularly if the solutions are heated to elevated temperatures such as those normally employed for a dry spinning process, the salts precipitate. The separation of salts may be detected by a more or less pronounced cloudiness of the solution or even by the appearance of particles visible to the naked eye, depending upon the quantity and the composition of the salts in the polymer, the temperature and concentration of the spinning solution and also the composition of the polymers. This precipitation of salt may give rise to serious trouble in the spinning process. For example, salts which precipitate in a very fine form before filtration are liable to block the filters, and the spinning solution is particularly liable to be troubled by salt precipitation if it is heated to elevated temperatures of about 110° to 150° C. after filtration and before the spinning nozzle. Coarse particles may then completely or partly block the nozzle apertures, or the apertures may become constricted by the gradual deposition of inorganic substances. Both the quality and the uniformity of the spinning material are thereby impaired, and the nozzles affected must be replaced. Frequent nozzle change not only reduces quality but also increases costs.

Various additives have already been proposed for preventing or removing cloudiness in spinning solutions of acrylonitrile polymers. The addition of carboxylic acid anhydrides, e.g. acetic acid anhydride, is said to prevent the cloudiness caused by decomposition products of the persulphate used for initiating the solution polymerisation of acrylonitrile. Cloudiness due to impurities and oligomers of the unsaturated sulphonate used as comonomer in solution polymerisation is also said to be prevented or else removed by the addition of maleic acid or saturated aliphatic, cycloaliphatic or aromatic sulphonic acids (East German Pat. No. 113,016 and No. 123,098). It has also been proposed to add inorganic or organic acids such as phosphoric, sulphuric, hydrochloric, nitric, malonic or citric acid in the solution polymerisation of acrylonitrile in order to obtain substantially colourless and transparent solutions (Austrian Pat. No. 236,642). In acrylonitrile polymers prepared by precipitation polymerisation, cloudiness which already occurs during preparation of the spinning solution at temperatures below 100° C. is said to be removable by adjustment to a pH of 3 to 4 with strong acids such as nitric acid, hydrochloric acid or sulphuric acid (Japanese Pat. No. 7,339,785). None of the above proposed additives, however, is suitable for preventing the crystallization of salts which occurs in spinning solutions of acrylonitrile polymers prepared by precipitation polymerisation, when these spinning solutions are heated to temperatures in the region of or above 100° C.

It has now been found that spinning solutions of acrylonitrile polymers in organic solvents can be stabilized against the crystallization of inorganic salts present in small quantities in the polymer by adding polyfunctional phosphonic acids, phosphonocarboxylic acids or polymers containing phosphonic acid groups and/or carboxyl groups. When used in quantities of from 0.005 to 0.5%, preferably from 0.01 to 0.1%, based on the quantity of polymer, the aforesaid substances either completely prevent the occurrence of cloudiness due to the precipitation of inorganic salts or the crystallization of coarse salt particles during the preparation and processing of the spinning solution or else reduce the size and number of the salt particles precipitated.

The present invention therefore relates to a process for the stabilization of a spinning solution of an acrylonitrile polymer and a solvent, which comprises adding from 0.005 to 0.5% based on the quantity of polymer, of at least one stabilizer selected from a polyfunctional phosphonic acid, a phosphonocarboxylic acid or a polymer containing phosphonic acid and/or carboxyl groups to the spinning solution.

The invention further relates to a spinning solution of an acrylonitrile polymer and a solvent which comprises from 0.005 to 0.5% based on the quantity of polymer, of at least one stabilizer selected from a polyfunctional phosphonic acid, a phosphonocarboxylic acid or a polymer containing phosphonic acid and/or carboxyl groups.

Spinning solutions which have been stabilized according to the present invention show markedly improved spinning characteristics. One additional advantage of the aforesaid stabilizers is that they improve the whiteness of yarns and fibres produced from such spinning solutions.

Compounds suitable for stabilizing the spinning solutions include polyfunctional phosphonic acids, e.g. 1-hydroxy-ethane-1,1-diphosphonic acid, amino-tris-methylene phosphonic acid and polyvinyl phosphonic acid; phosphonocarboxylic acids such as 2-phosphonobutane-1,2,4-tricarboxylic acid and 2,4-diphosphonobutane-1,2-dicarboxylic acid and/or polycarboxylic acids such as polyacrylic acid or polymaleic acid as well as copolymers of vinylphosphonic acid and/or unsaturated carboxylic acids and other unsaturated compounds. These stabilizers are advantageously added to the solvents for the acrylonitrile polymer before preparation of the spinning solution in order to ensure uniform distribution. Suitable solvents for acrylonitrile polymers are, for example, dimethyl formamide and dimethyl acetamide.

The acrylonitrile polymers whose spinning solutions are stabilized according to the present invention may be homopolymers or copolymers of acrylonitrile. The comonomers are usually other vinyl compounds, such as acrylic and methacrylic acid esters, styrene, vinyl chloride, vinylidene chloride or vinyl acetate and unsaturated compounds containing ionisable acid groups, e.g. allyl and methallyl sulphonic acid, vinyl sulphonic acid, styrene sulphonic acid and salts thereof. The quantity of inorganic salts contained in these polymers, predominantly sodium sulphate and potassium sulphate, cannot be accurately determined because the polymer molecules which have been prepared by initiation with a redox system carry end groups with ionisable sulphonic acid or sulphate groups which are at least partly in salt form. In addition, acid groups which are introduced into the polymer by a comonomer to improve the dye absorption may also be partly or completely in the salt form. The proportion of inorganic substances in the polymer, as determined by ashing, therefore indicates not only the quantity of free or absorptively bound salts in the polymer but also the quantity of metal ions, which are mainly alkali metal ions, which are bound in the polymer by way of ionic groups.

A simple test to determine whether a polymer contains inorganic constitutents which precipitate when the solution is heated consists of heating a solution of the polymer to elevated temperatures for some length of time. After tempering, any precipitated salts can be detected by the naked eye either as cloudiness or as discrete particles, and the size, shape and frequency of the salt crystals can be assessed under a microscope. The precipitated salt may then be centrifuged off optionally after dilution of the solution, and its quantity can then be determined. This simple laboratory test can be used to determine whether a polymer contains constituents which are liable to cause trouble in spinning and also to assess the effectiveness of additives used for stabilizing spinning solutions against the separation of salts.

Little is known about the mechanism of the stabilizers of the present invention. It is assumed that the substances which act according to the present invention interfere with crystal growth, for example by occupying the active centres on the crystal nuclei. Evidence for this assumption is the observation that at stabilizer concentrations which are insufficient to prevent salt separation completely, the form of the crystals is altered. Instead of regular crystals, e.g. in stellate formation, loose agglomerations without any recognisable crystal structure are frequently formed under these particular conditions. In any event the stabilizers according to the present invention do not act as solubilizing agents since their concentration is too low, and in any case they are incapable of redissolving a salt once it has precipitated.

The following examples serve to explain the invention in more detail without limiting it. All parts and percentages are on a weight basis.

EXAMPLE 1

A copolymer of 93.6% acrylonitrile, 5.7% methylacrylate and 0.7% sodium methallyl sulphonate prepared by precipitation polymerisation in water using a redox system of potassium peroxodisulphate, sodium bisulphite and iron sulphate and which has an ash content of 0.11%, is dissolved in dimethyl formamide at 80° C. with stirring. The clear, highly viscous solution obtained, which has a polymer concentration of 30%, is heated to 140° C. for 4 hours, after which time, numerous particles can be detected in the solution with the naked eye. Under a microscope, the particles appear as large, branched crystals.

EXAMPLE 2

700 g of dimethyl formamide is mixed with 0.3 g of a 50% aqeuous solution of 2,4-diphosphonobutane-1,2-dicarboxylic acid. 300 g of the same polymer as used in Example 1 is dissolved in this solution at 80° C. with stirring. The quantity of phosphonocarboxylic acid added is 0.05%, based on the quantity of polymer. The clear solution obtained is heated to 140° C. for 4 hours. After this time the polymer solution is completely clear after it has been tempered, and no crystals can be seen even under a microscope.

When the quantity of phosphonocarboxylic acid is reduced to 0.025%, based on the quantity of polymer, the polymer solution is found to have individual, very small particles after it has been tempered. Under a microscope, these particles appear as small, round structures. Both the number and the size of salt particles are clearly reduced as compared to Example 1.

EXAMPLE 3

30% solutions of the polymer described in Example 1 in dimethyl formamide with various additives present therein are prepared analogously to Example 2 and heated to 140° C. for 4 hours. The tempered solutions are studied with the naked eye and under a microscope. The results are summarized in Table 1. Comparison experiments show that no comparable stabilization is achieved by using other inorganic or organic acids or acid anhydrides.

TABLE 1

| Additive | Concentration %[1] | Examination[2] |
|---|---|---|
| 2-phosphonobutane-1,2,4-tricarboxylic acid | 0.05 | (a) slight cloudiness (b) small round structures |
| 1-hydroxyethane-1,1-diphosphonic acid | 0.05 | (a) slight separation of salt (b) small round structures which are joined together |
| amino-tris-methylene phosphonic acid | 0.05 | (a) slight cloudiness (b) isolated medium sized round structures |
| polymaleic acid (Belgard EV, Ciba-Geigy) | 0.05 | (a) slight cloudiness (b) small round structures |
| polyacrylic acid (Size S, BASF) | 0.1 | (a) clear solution (b) very small round structures |
| Comparison Experiments | | |
| None | — | (a) very heavy salt deposit (b) large stars |
| sulphuric acid | 0.5 | (a) very heavy salt deposit (b) large stars with long points |
| p-toluene sulphonic acid | 0.1 | (a) heavy salt deposit (b) large stars |
| methane sulphonic acid | 0.05 | (a) heavy salt deposit (b) large stars |
| acetic acid | 0.5 | (a) very heavy salt deposit (b) large stars |
| maleic acid | 0.2 | (a) heavy salt deposit (b) large crystal branches |
| acetic acid anhydride | 0.2 | (a) heavy salt deposit (b) large stars |
| benzene phosphonic acid | 0.05 | (a) heavy salt deposit |

TABLE 1-continued

| Additive | Concentration %[1] | Examination[2] |
|---|---|---|
| | | (b) large stars |

[1] based on the quantity of polymer
[2] (a) examination with the naked eye
(b) examination under a microscope

EXAMPLE 4

A copolymer which has the same composition as that of Example 1 but which was more vigorously washed after its preparation, and which has an ash content of 0.08%, is made up into a 30% solution in dimethyl formamide with the addition of 0.05% (based on the quantity of polymers) of 2-phosphonobutane-1,2,4-tricarboxylic acid. The solution is still completely clear after 4 hours at 140° C. and no crystals can be seen, even under a microscope. A solution of the same polymer without the addition of phosphonocarboxylic acid has numerous small particles after tempering, and these appear as small stars under a microscope.

EXAMPLE 5

A copolymer of 91.1% acrylonitrile, 5.4% methyl acrylate and 3.4% sodium methallyl sulphonate prepared by precipitation polymerisation using the same redox system as in Example 1, and which has an ash content of 0.15% is made up into a 30% solution in dimethyl formamide with the addition of 0.05% of 2,4-diphosphonobutane-1,2-dicarboxylic acid, based on the quantity of polymer, and is then heated at 140° C. for 4 hours. The solution is completely clear when tempered, and no crystals can be seen even under a microscope.

A solution of the same polymer without the additive shows heavy cloudiness after tempering, and numerous small, round crystals can be seen under a microscope.

EXAMPLE 6

A homopolymer of acrylonitrile having an ash content of 0.04% is made up into a 30% solution in dimethyl formamide with the addition of 0.05% of 2,4-diphosphonobutane-1,2-dicarboxylic acid based on the quantity of polymer, and the solution is heated at 140° C. for 4 hours. The tempered solution is clear, and no crystals can be seen under a microscope. A solution of the same polymer without the additive shows particles after tempering, and these particles appear as a large number of small stars under a microscope.

EXAMPLE 7

4,800 kg of the polymer used in Example 4 and a mixture of 11,465 kg of dimethyl formamide and 5 kg of a 50% aqeuous solution of 2-phosphonobutane-1,2,4-tricarboxylic acid are worked up into a thick paste in a screw. The paste is then heated to 85° C. in a vanadium steel vessel having a stirrer and converted into a clear, viscous solution by stirring. The solution is filtered at approximately 85° C. and is then delivered to the nozzles of a spinning machine. The spinning solution is heated to 140° C. in a heat exchanger immediately before the nozzles and is then spun under the usual conditions of dry spinning. The number of nozzles which have to be changed in the spinning machine due to interference with the spinning process is recorded over a period of 60 days and is found to be 15.8 nozzle changes per 1,000 spinning shafts per day. After this spinning experiment, a solution which has been prepared in the same way as described above but without the addition of 2-phosphonobutane-1,2,4-tricarboxylic acid is spun under the same conditions. After about 14 days, the number of nozzle changes increases to over 30 nozzle changes per 1,000 spinning shafts per day and reaches 60 nozzle changes per 1,000 spinning shafts per day after 21 days. The experiment is then stopped. Deposits causing constriction are found on the bores of the spinning nozzles which have had to be replaced, and some of the nozzle apertures are blocked by crystalline particles. Similar deposits are also found on the heated surfaces of the heat exchangers.

We claim:

1. A process for the stabilization of a spinning solution of an acrylonitrile polymer and a solvent which comprises adding from 0.005 to 0.5 percent, based on the quantity of polymer, of at least one stabilizer selected from 2-phosphonobutane-1,2,4-tricarboxylic acid, 2,4-diphosphonobutane-1,2-dicarboxylic acid, polyacrylic acid or polymaleic acid to the spinning solution.

2. A process according to claim 1 wherein 0.01 to 0.1 percent of said stabilizer is added to the spinning solution.

3. A process according to claim 1 wherein said stabilizer is 2-phosphonobutane-1,2 or -tricarboxylic acid.

4. A process according to claim 1 wherein said stabilizer is 2,4-diphosphonobutane-1,2-dicarboxylic acid.

5. A process according to claim 1 wherein said stabilizer is polyacrylic acid.

6. A process according to claim 1 wherein said stabilizer is polymaleic acid.

7. A spinning solution of an acrylonitrile polymer and a solvent which contains from 0.005 to 0.5 percent by weight, based on the quantity of acrylonitrile polymer, of at least one stabilizer selected from the group consisting of 2-phosphonobutane-1,2,4-tricarboxylic acid, 2,4-diphosphonobutane-1,2-dicarboxylic acid, polyacrylic acid and polymaleic acid.

* * * * *